United States Patent
Kawabe

(10) Patent No.: US 7,257,069 B2
(45) Date of Patent: Aug. 14, 2007

(54) OPTICAL STORAGE DEVICE AND OPTICAL DEVICE

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 10/306,153

(22) Filed: Nov. 27, 2002

(65) Prior Publication Data

US 2003/0107965 A1 Jun. 12, 2003

(30) Foreign Application Priority Data

Dec. 6, 2001 (JP) ............................. 2001-373103
Mar. 29, 2002 (JP) ............................. 2002-097179

(51) Int. Cl.
*G11B 7/00* (2006.01)
(52) U.S. Cl. .................................................. 369/53.18
(58) Field of Classification Search .............. 369/53.18
See application file for complete search history.

(56) References Cited

U.S. PATENT DOCUMENTS

| 5,046,058 | A | * | 9/1991 | Shimonou | 369/30.17 |
|---|---|---|---|---|---|
| 5,258,966 | A | * | 11/1993 | Yanagi | 369/30.17 |
| 5,317,550 | A | * | 5/1994 | Semba | 369/30.2 |
| 5,426,545 | A | * | 6/1995 | Sidman et al. | 360/78.09 |
| 5,675,561 | A | * | 10/1997 | Yoshioka | 369/44.25 |
| 6,172,838 | B1 | * | 1/2001 | Ohba | 360/77.04 |
| 6,246,647 | B1 | | 6/2001 | Tsutsui et al. | |
| 6,351,341 | B1 | * | 2/2002 | Lee et al. | 360/75 |

FOREIGN PATENT DOCUMENTS

| JP | 8-203108 | 8/1996 |
|---|---|---|
| JP | 09-027136 | 1/1997 |
| JP | 10-112035 | 4/1998 |
| JP | 11-185363 | 7/1999 |
| JP | 2003-151150 | 5/2003 |

* cited by examiner

*Primary Examiner*—Gautam R. Patel
(74) *Attorney, Agent, or Firm*—Greer, Burns & Crain, Ltd.

(57) ABSTRACT

An optical storage device having a lens opposite to a storage medium comprises an actuator that moves the lens, a mechanical shock acceleration sensing means that senses a mechanical shock acceleration, a collision prevention control means that drives the actuator for a predetermined period of time with a first driving force greater than the maximum rating force of the actuator when the mechanical shock acceleration sensed by the mechanical shock acceleration sensing means becomes a value equal to a predetermined value, and then, that drives the actuator with a second driving force smaller than the maximum rating force of the actuator.

20 Claims, 10 Drawing Sheets

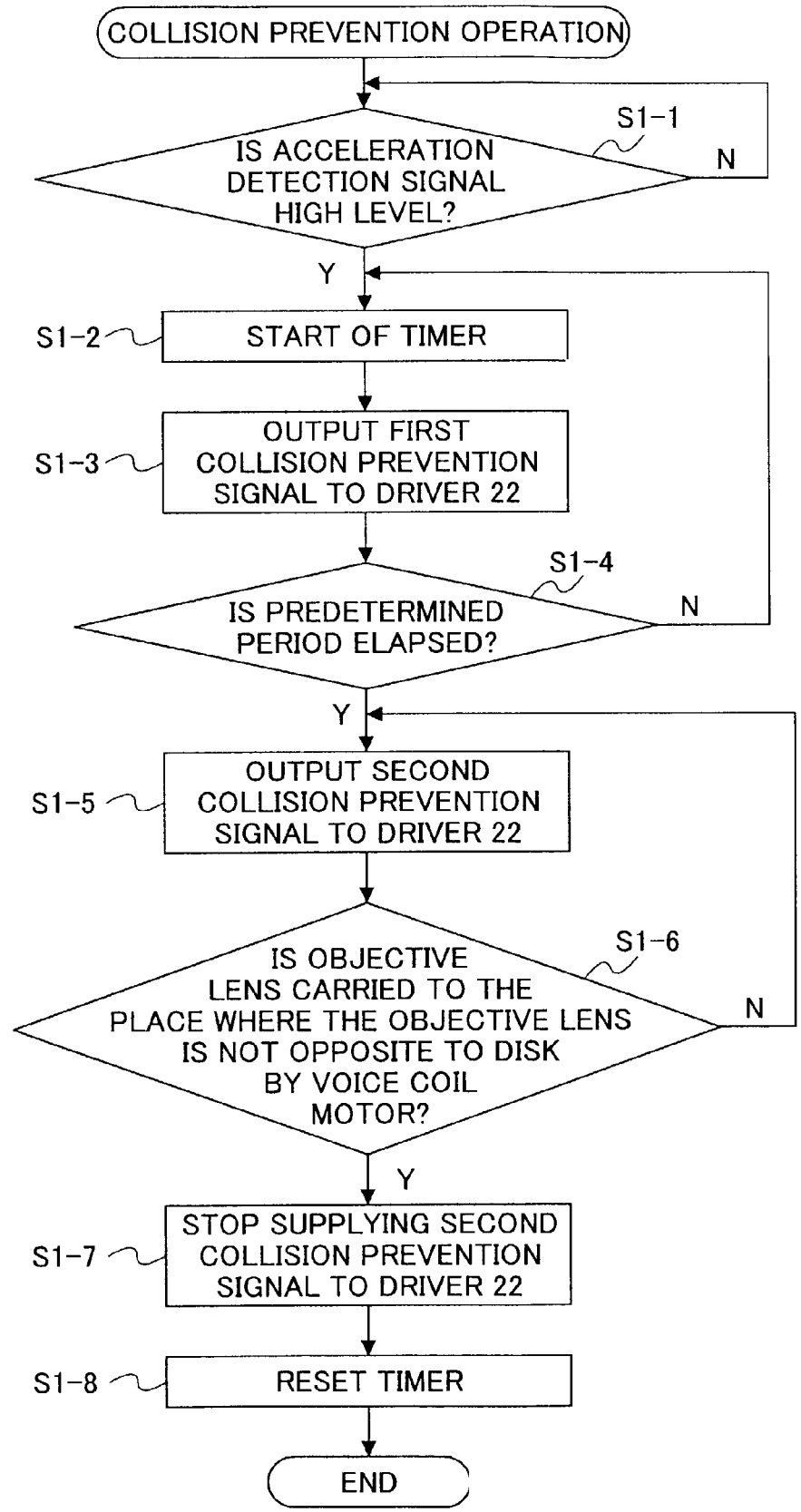

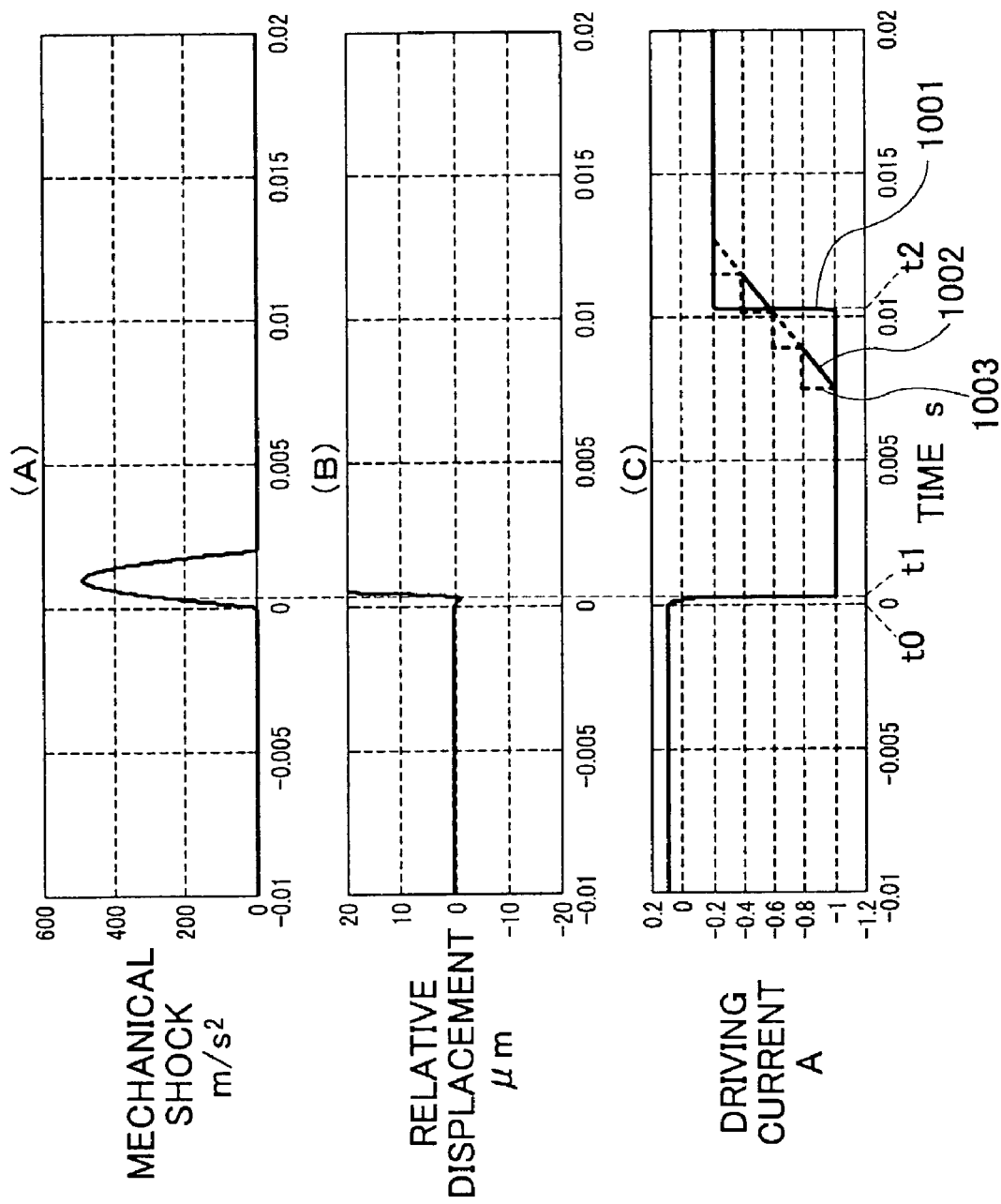

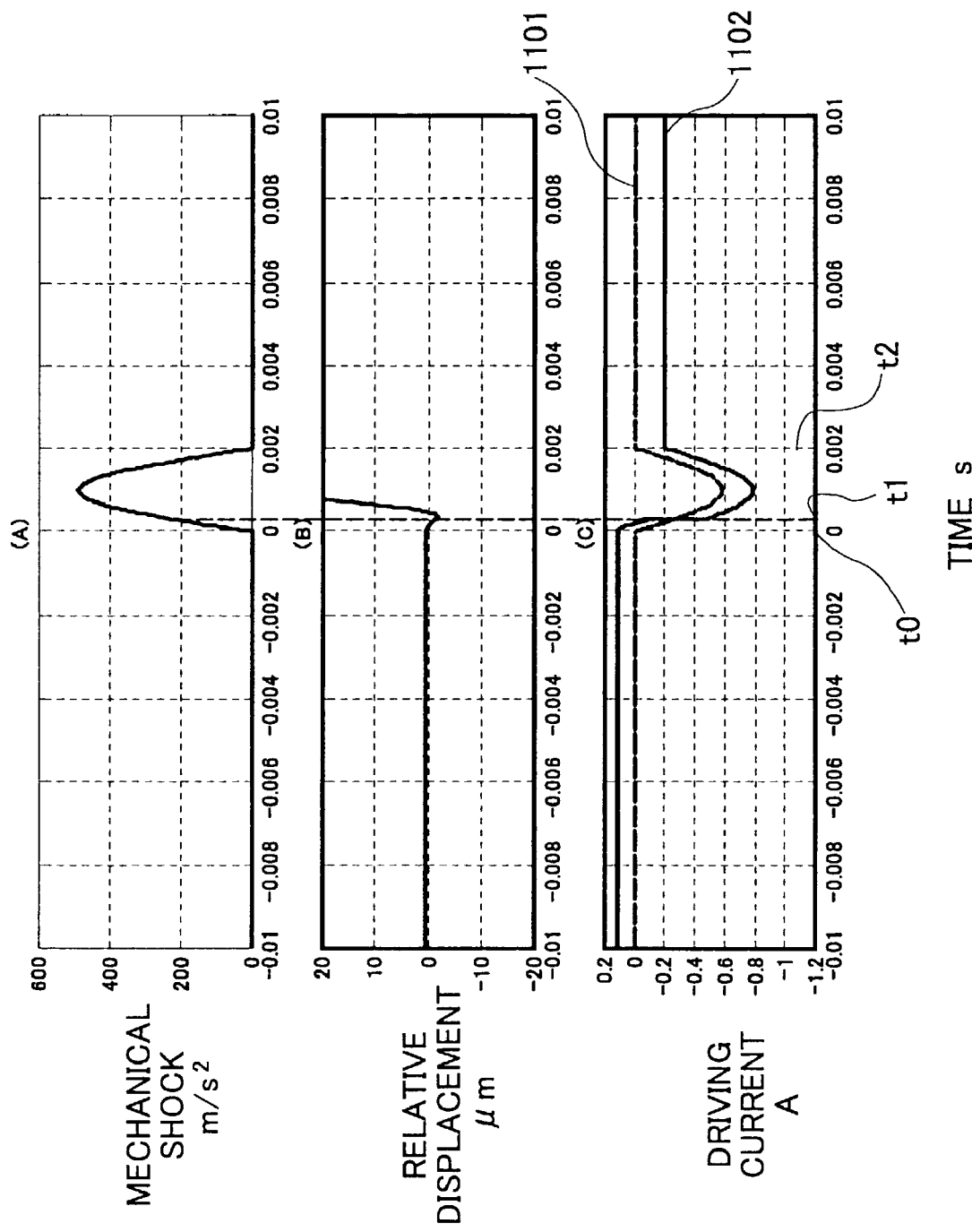

OPTICAL STORAGE DEVICE AND OPTICAL DEVICE

BACKGROUND OF THE INVENTION

1. Field of the Invention

The present invention generally relates to an optical storage device and an optical device, and more particularly to an optical storage device and an optical device in which a lens oscillates toward an object and away from the object.

2. Description of the Related Art

In the field of optical storage devices, such as a disk apparatus, focus servo control, in which a laser beam is focused on a recording layer of a disk, is performed in order to accurately record data on the disk and to reproduce the recorded data from the disk. The focus servo control system controls the position of an objective lens in order to keep the distance between the objective lens and the disk constant by means of a feedback control loop that uses a focus error signal.

Recently, the focused laser beam spot size is being reduced to raise the recording density. As a result, the distance between the objective lens and the disk is also tending to be reduced.

Further, the detection range of the focus error signal, which can be used as a linear position error along the axis of the objective lens, is within a range of ±1 μm from a just focus in focus point.

Therefore, when a mechanical shock is applied to the disk apparatus and thereby the distance between the objective lens and the disk becomes very short, the focus servo system cannot control the position of the objective lens by means of the focus error signal. As a result, the object lens may collide with the disk.

Therefore, an arrangement is needed in which the objective lens is compulsorily moved away from the disk in order to avoid a collision between the objective lens and the disk when the mechanical shock is detected.

A method which compulsorily moves the objective lens away from the disk is described in, for example, Laid Open Japanese Patent Application Number 8-203108. A disk apparatus described in the Laid Open Japanese Patent Application Number 8-203108 monitors the focus error signal. When a defocusing level greater than a predetermined level is detected, then the total amount of reflected light is monitored. When the total amount of reflected light becomes a level smaller than a predetermined level, it is decided that the objective lens is shifted by a mechanical shock and then the objective lens is compulsorily moved away from the disk.

Examples of detection methods of mechanical shock are a displacement detection method based on the focus error signal as described in the Laid Open Japanese Patent Application Number 8-203108 and an acceleration detection method in which the mechanical shock is detected by means of an acceleration sensor and a focus servo current.

Next, the displacement detection method and the acceleration detection method will be explained.

FIG. 1 and FIG. 2 show a comparison between the displacement detection method and the acceleration detection method. FIG. 2 shows an enlarged part of FIG. 1, which is enlarged along the time axis. FIG. 1(A) and FIG. 2(A) show a relation between a defocus value and elapsed time since the mechanical shock is applied. FIG. 1(B) and FIG. 2(B) show a relation between a control current A and the elapsed time since the mechanical shock is applied FIG. 1(C) and FIG. 2(C) show a relation between the mechanical shock value G and the elapsed time since the mechanical shock is applied. In each figure, the bold line shows an operational waveform of the acceleration detection method and the dotted line shows an operational waveform of the displacement detection method.

For example, as shown in FIG. 1(C) and FIG. 2(C), the mechanical shock is applied at 0 ms, has a half sine wave shape, a maximum value of 100 G and a duration of 2 ms. One G represents the acceleration due to gravity. In a case in which the acceleration detection method is employed, it is possible to start an operation to move the objective lens away from the disk as shown in FIG. 2(B) when the mechanical shock reaches a threshold value of 10 G as shown in FIG. 2(C). However, in a case in which the displacement detection method is employed, the objective lens is compulsorily moved away from the disk when the defocus value becomes, for example, −0.6 μm as shown in FIG. 2(A). Therefore, the start point of moving the objective lens for the displacement detection method is later than that for the acceleration detection method as shown in FIG. 2(B).

As described above, the start point of moving the objective lens for the displacement detection method is later than a point of time when the mechanical shock acceleration is applied. Therefore, the acceleration detection method is used to move the objective lens away from the disk quickly.

Next, a conventional method for moving the object lens away from the disk will be explained.

FIG. 3 shows a block diagram of a focusing mechanism and a focusing control system for the conventional disk apparatus.

A disk 90 is rotated by a spindle motor, which is not shown in FIG. 3. The rotational axis is AA'. A moving head 80 is provided opposite to the disk 90.

FIG. 4 shows a perspective view of the moving head 80 and FIG. 5 shows a sectional view of the moving head 80.

The moving head 80 can be moved in a radial direction of the disk 90 along a line BB' by a voice coil motor 91.

The moving head 80 has a lens holder 81, a leaf spring 82, a focusing coil 83, an objective lens 84, a rising mirror 85, a moving head body 86 and permanent magnets 87. The objective lens 84 is attached to the lens holder 81. The lens holder 81 is attached to the moving head body 86 by the leaf spring 82 and can oscillate in directions AA'. The focusing coil 83 is attached on a side of the lens holder 81. The permanent magnets 87 are attached to the moving head body 86 opposite to the focusing coils 83.

When the focusing coil 83 is supplied with a driving current, a force is generated in the focusing coil 83 by electromagnetic interaction between the driving current through the coil 83 and a magnetic field caused by the permanent magnet 87. The electromagnetic force generated in the focusing coil 83 can oscillate the lens holder 81 in the directions AA'. As lens holder 81 is oscillated in the directions AA', the objective lens 84 is also oscillated in the directions AA'. Therefore, it is possible to use the objective lens 84 for focusing control.

The rising mirror 85 is attached to the moving head body 86 under the objective lens 84. The light beam L is supplied to the rising mirror 85 from a stationary head 100. The rising mirror 85 reflects the light beam L supplied from the stationary head 100 to the objective lens 84 in the direction A. The light beam L reflected by the rising mirror 85 is supplied to the objective lens 84. The objective lens 84 focuses the light beam L supplied from the rising mirror 85 on the disk 90.

The light beam L focused on the disk 90 is reflected on the disk 90 and then supplied to the rising mirror 85 through the objective lens 84. The rising mirror 85 reflects the light beam L supplied from the objective lens 84 to the stationary head 100 in the direction B'.

The stationary head 100 has a laser diode 101, a collimator lens 102, a first beam splitter 103, a first servo lens 104, a first photo detector 105, a Foucault prism 108, a second beam splitter 106, a second servo lens 107 and a second photo detector 109.

The laser diode 101 emits a laser light. The laser light emitted by the laser diode 101 is supplied to the moving head 80 through the collimator lens 102 and the first beam splitter 103. The return light beam from the moving head 80 is reflected by the first beam splitter 103 and then is reflected by the second beam splitter 106 and supplied to the Foucault prism 108. The Foucault prism 108 splits the incident light beam. The light beam split by the Foucault prism 108 is focused on the first photo detector 105 by the first servo lens 104. For example, the first photo detector 105 is a quadrant photo diode. A focus error signal generation circuit 51 generates a focus error signal using currents supplied from the quadrant photo diode. Further, the return light beam from the moving head 80 is reflected by the first beam splitter 103 and supplied to the second servo lens 107 through the second beam splitter 106. The second servo lens 107 focuses the incident light beam on the second photo detector 109. For example, the second photo detector 109 is a photo diode divided into two parts. A track error signal generation circuit 41 generates a track error signal using currents supplied from the photo diode divided into two parts.

FIG. 6 shows an output characteristic of a focus error signal when the objective lens is displaced.

The focus error signal has the output characteristic shown with a dotted line in FIG. 6. The horizontal axis shows the displacement from the disk 90. The arrow shows the direction in which the objective lens is moved away from the disk 90. In a part CC' of the curve between a maximum value and a minimum value shown in FIG. 6, the output voltage varies linearly as the displacement. This part CC' is used as the focus error signal, that is to say, the error signal of the distance between the position of the objective lens 84 and the focus point.

The focus error signal generated by the focus error signal generation circuit 51 is supplied to a phase compensation circuit 52. The phase compensation circuit 52 filters the focus error signal for stabilizing the servo loop and generates a focus servo signal. The focus servo signal generated by the phase compensation circuit 52 is supplied to an output selection circuit 57. The output selection circuit 57 is supplied with both the focus servo signal from the phase compensation circuit 52 and an objective lens collision prevention signal from an objective lens collision prevention signal generation circuit 55.

The output selection circuit 57 selects the focus servo signal supplied from the phase compensation circuit 52 and supplies the focus servo signal to the focus current driving circuit 50 during a typical focus servo operation. The focus current driving circuit 50 supplies the focus coil 83 with a current based on the focus servo signal. The objective lens 84 is moved by the current so that the focus error signal becomes zero and thereby the focus servo loop is formed.

The output selection circuit 57 selectively supplies the focus current driving circuit 50 with either the focus servo signal supplied from the phase compensation circuit 52 or the objective lens collision prevention signal from the objective lens collision prevention signal generation circuit 55 according to a switching signal supplied from a mechanical shock detection circuit 54. The mechanical shock detection circuit 54 detects an acceleration of the mechanical shock. The mechanical shock detection circuit 54 outputs a high level signal when the acceleration of the mechanical shock is greater than a predetermined value and a low level signal when the acceleration of the mechanical shock is smaller than the predetermined value The output selection circuit 57 selects the focus servo signal supplied from the phase compensation circuit 52 while the switching signal from the mechanical shock detection circuit 54 has the low level. On the other hand, the output selection circuit 57 selects the objective lens collision prevention signal from the objective lens collision prevention signal generation circuit 55 instead of the focus servo signal when the switching signal from the mechanical shock detection circuit 54 becomes the high level. The focus current driving circuit 50 supplies the focus coil 83 with a constant current which current moves the objective lens away from the disk 90 after the objective lens collision prevention signal from the objective lens collision prevention signal generation circuit 55 is supplied by the output selection circuit 57.

As described above, conventionally, when the mechanical shock detection circuit 54 detects the acceleration of the mechanical shock greater than a predetermined value, then the focus coil 83 is supplied with a constant driving current and the objective lens is moved away from the disk 90.

However, there is an upper limit of a current that can be supplied to the focus coil 83 when the objective lens 84 is moved away from the disk in the conventional disk apparatus. For example, it is assumed that the resistance of the focus coil 83 is 5 Ω. The lens actuator, which is a mechanical part, is damaged if the DC current having a value greater than ±0.2 [A] is maintained in the focus coil 83, because an adhesive which covers the focus coil 83 is burned by Joule heat generated by the DC current. Therefore, in this case described above, the maximum value of the current is ±0.2 [A] while the objective lens 84 is being moved away from the disk.

FIG. 7 shows time response characteristics when a mechanical shock is applied to the disk apparatus. In FIG. 7, the mechanical shock having a half sine shape is applied to the disk apparatus at time zero, said mechanical shock having a maximum acceleration of 50 G (491 m/s$^2$) and a duration of 2 ms, while focus servo control is being performed, and then the mechanical shock is detected, and the collision prevention current of −0.2 [A] is supplied to the focus coil 83. FIG. 7(A) shows the mechanical shock. FIG. 7(B) shows relative displacement between the objective lens and the disk in the direction perpendicular to the disk surface. FIG. 7(C) shows the lens actuator driving current.

In FIG. 7(B), a negative value of the relative displacement shows that the position of the objective lens 84 is nearer to the disk than the position of the focus point and the objective lens is moved toward the disk about 130 μm from the focus point, which is shown by a value of zero, by the mechanical shock. In the case of a conventional objective lens for a wavelength of 650 nm and NA of 0.55, the working distance is about 1.2 mm. Therefore, the objective lens does not collide with the disk until the relative displacement becomes —1200 μm. However, in case of an objective lens for a short wavelength and a large numerical aperture, for example the wavelength of 410 nm and the numerical aperture (NA) of 0.85, the working distance between the objective lens and the disk is less than several tens of μm. Therefore, the objective lens 84 collides with the disk 90 in the case shown in FIG. 5.

In the case that the working distance is 1.2 mm, it is possible to attach a stopper on the moving head body 86 to limit the oscillation of the lens holder 81 in the directions AA' and thereby to prevent the objective lens from colliding with the disk. However, in the case that the working distance is less than several tens of μm, it is impossible to attach the stopper on the moving head body 86 because the dynamic axial runout of the disk 90 is greater than the working distance.

SUMMARY OF THE INVENTION

It is a general object of the present invention to provide an optical storage device and an optical device in which the above disadvantages are eliminated.

A more specific object of the present invention is to provide an optical storage device and an optical device in which a lens is safely and reliably moved away from an object when a mechanical shock is applied to the device.

The above objects of the present invention are achieved by an optical storage device having a lens opposite to a storage medium. The optical storage device comprises an actuator that moves the lens, a mechanical shock acceleration sensing means that senses the mechanical shock acceleration, a collision prevention control means that drives the actuator for a predetermined period with a first driving force greater than the maximum rating force of the actuator when the mechanical shock acceleration sensed by the mechanical shock acceleration sensing means becomes a value equal to a predetermined value, and then, that drives the actuator with a second driving force smaller than the maximum rating force of the actuator other than the first force greater than the maximum rating force.

According to the present invention, the collision prevention operation is started when the mechanical shock acceleration is detected. Therefore, it is possible to achieve a fast response to the applied mechanical shock. At the start of the collision prevention operation, the actuator is driven by the force greater than the maximum rating force of the actuator. Therefore, it is possible to prevent the lens from oscillating excessively. As a result, it is possible to prevent the lens from colliding with the storage medium even if the present invention is applied to an optical memory device in which the working distance between the lens and the storage medium is short, for example, an optical device using the front illumination method.

Further, because the actuator is driven with a force greater than the maximum rating force for only a short period soon after the mechanical shock is applied, the actuator does not suffer any damage.

BRIEF DESCRIPTION OF THE DRAWINGS

Other objects, features and advantages of the present invention will become more apparent from the following detailed description when read in conjunction with the accompanying drawings, in which:

FIG. 9 shows a flow chart of a collision prevention operation to move an objective lens away from a disk by a DSP 16 according to the present invention;

FIG. 10 shows waveforms of a collision prevention operation according to the present invention; and FIG. 11 shows waveforms of a collision prevention operation of a second embodiment according to the present invention.

DESCRIPTION OF THE PREFERRED EMBODIMENTS

A first embodiment according to the present invention will be explained.

Figure 8:
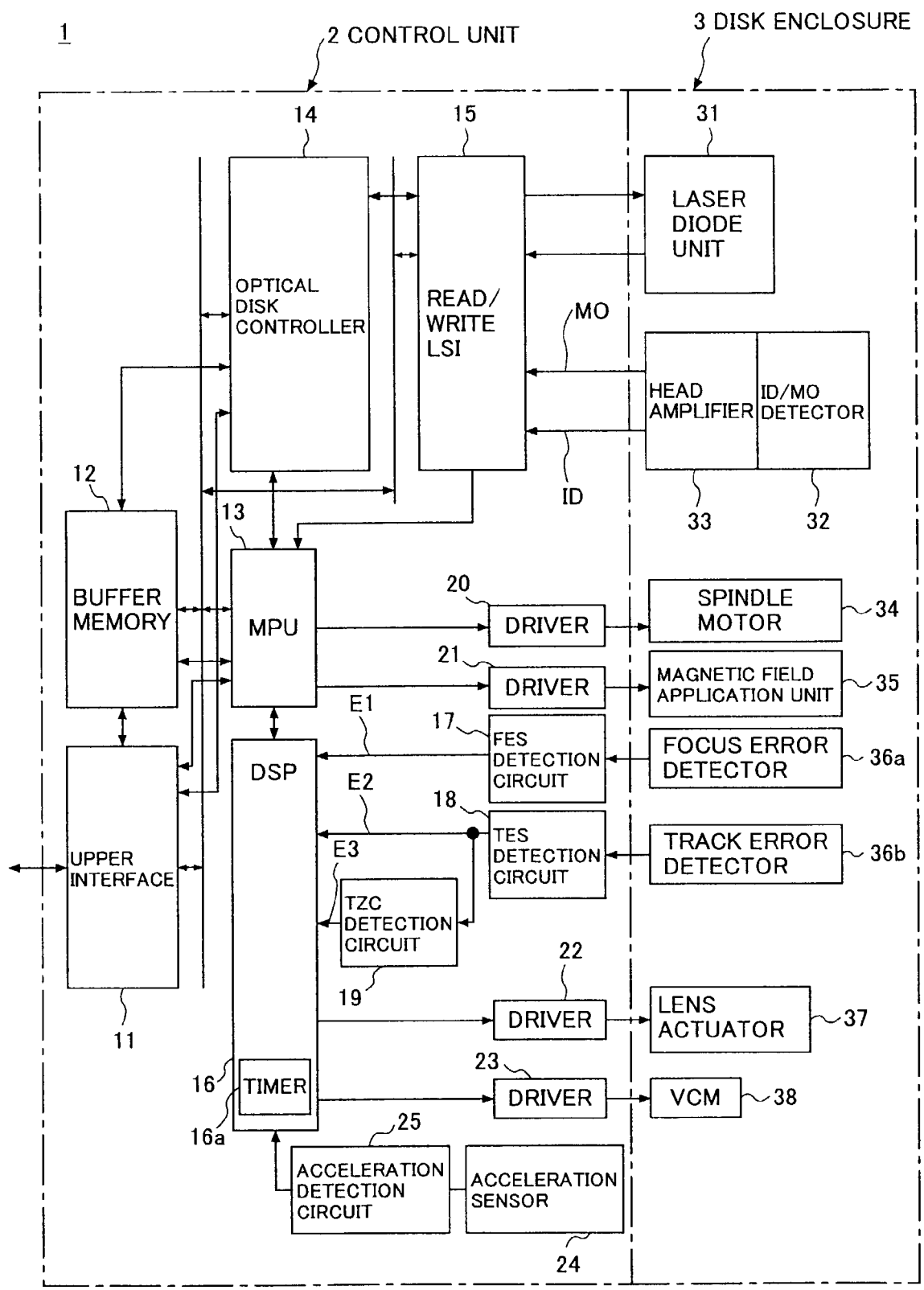
FIG. 8 shows a block diagram of an embodiment of a disk apparatus according to the present invention.

FIG. 8 shows a block diagram of an embodiment of a disk apparatus according to the present invention.

The disk apparatus 1 according to the present invention mainly has a control unit 2 and a disk enclosure 3.

The control unit 2 has an upper interface 11, a buffer memory 12, an MPU 13, an optical disk controller 14, a read/write LSI 15, a DSP 16, a focus error detection circuit 17, a track error detection circuit 18, a track zero-crossing detection circuit 19, drivers 20 through 23, an acceleration sensor 24 and an acceleration detection circuit 25. The disk enclosure 3 has a laser diode unit 31, an ID/MO signal detector 32, a head amplifier 33, a spindle motor 34, a magnetic field application unit 35, a focus error detector 36a, a track error detector 36b, a lens actuator 37 and a voice coil motor 38.

Figure 1:
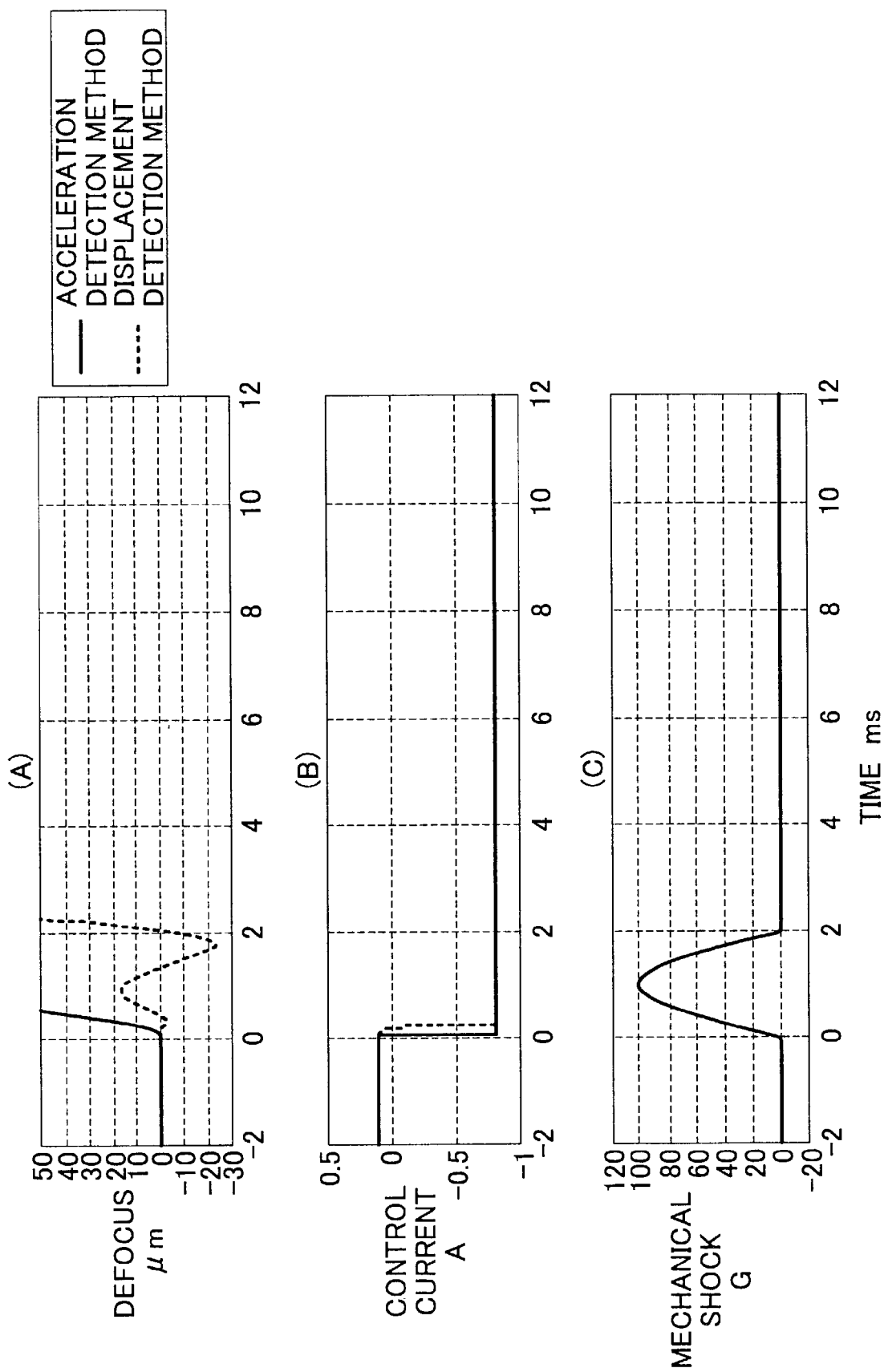
FIG. 1 shows a comparison between the displacement detection method and the acceleration detection method according to the prior art.
Figure 2:
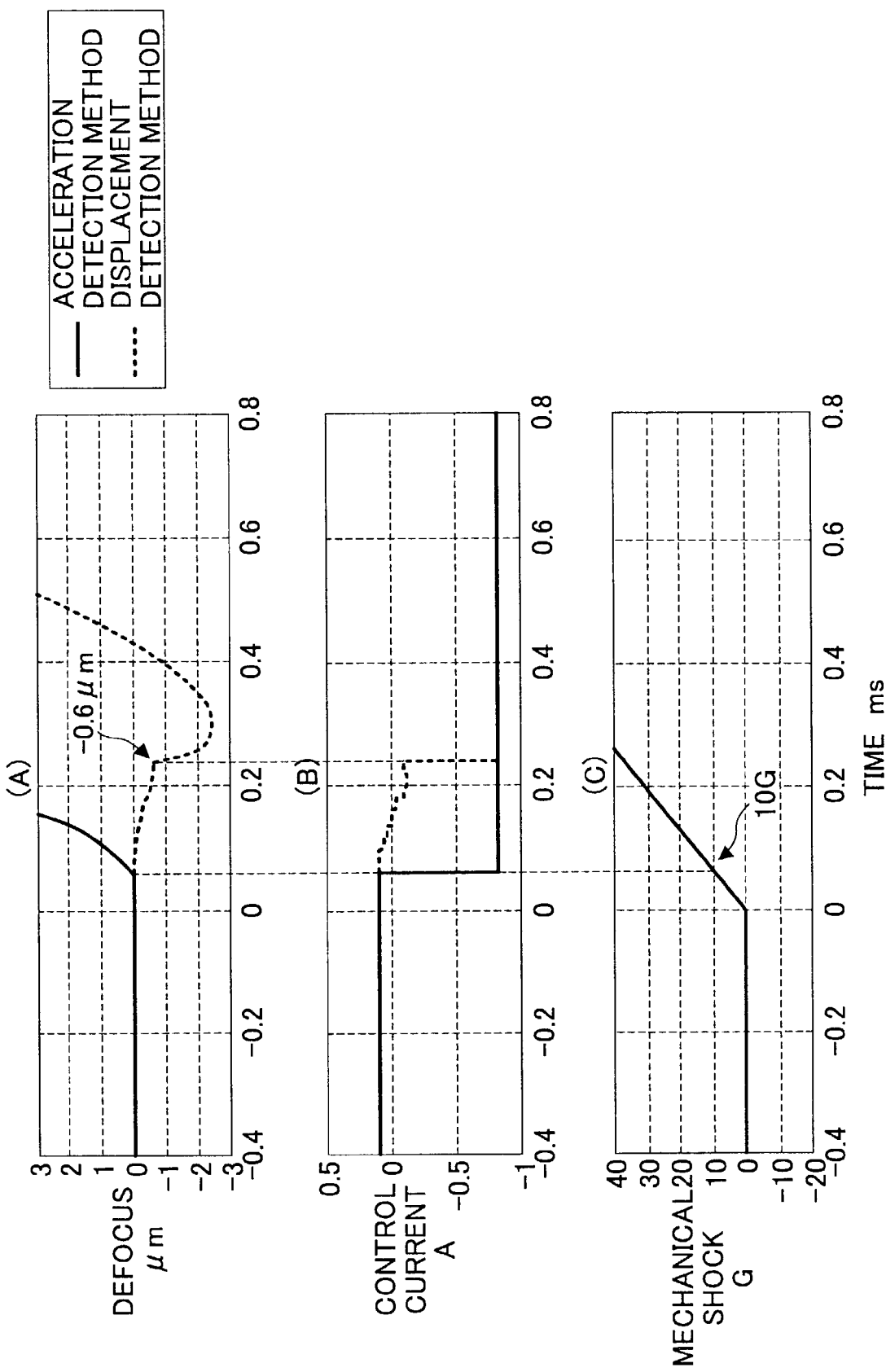
FIG. 2 shows an enlarged part of FIG. 1, which is enlarged along the time axis according to the prior art.
Figure 3:
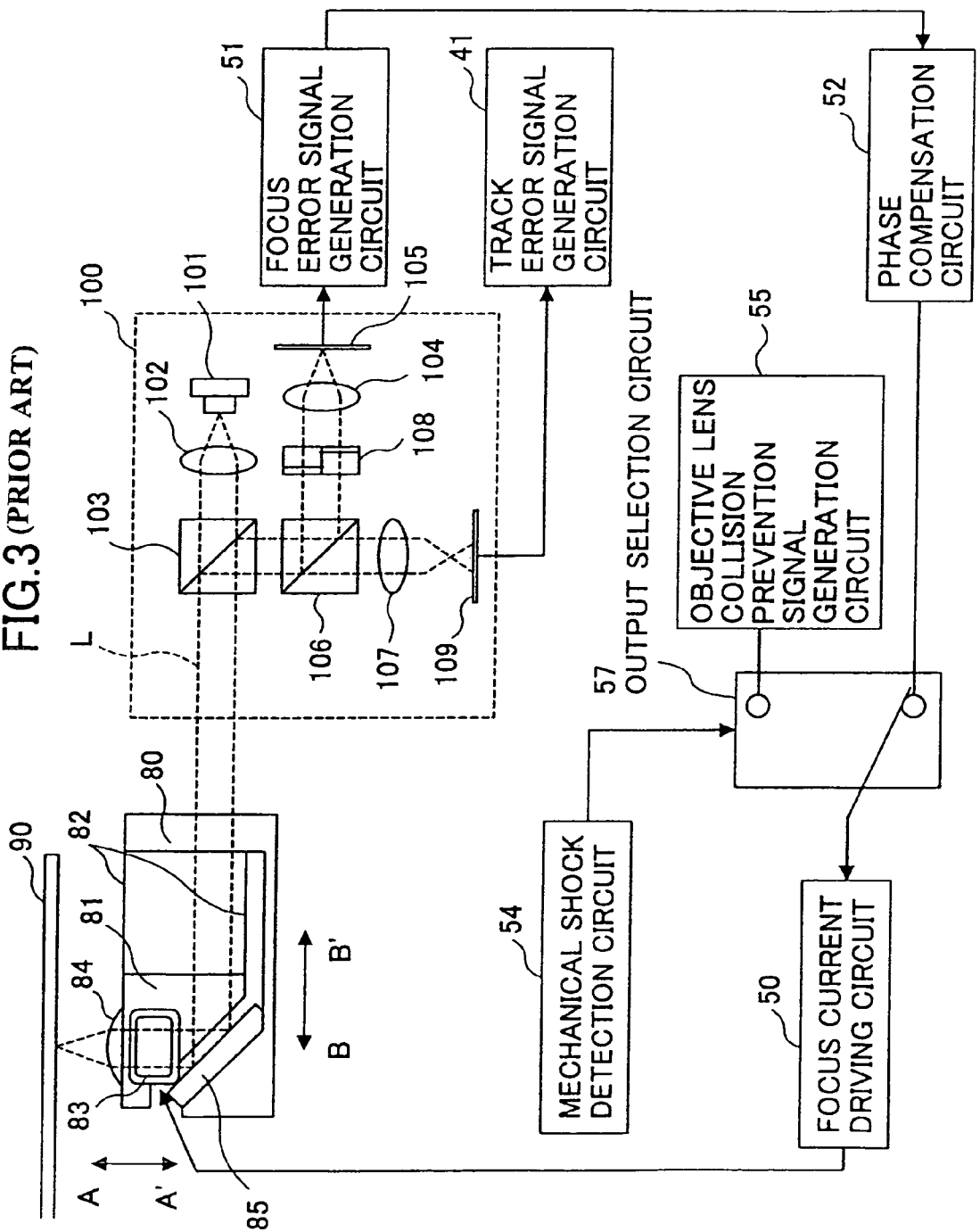
FIG. 3 shows a block diagram of a focusing mechanism and a focusing control system for the conventional disk apparatus.
Figure 4:
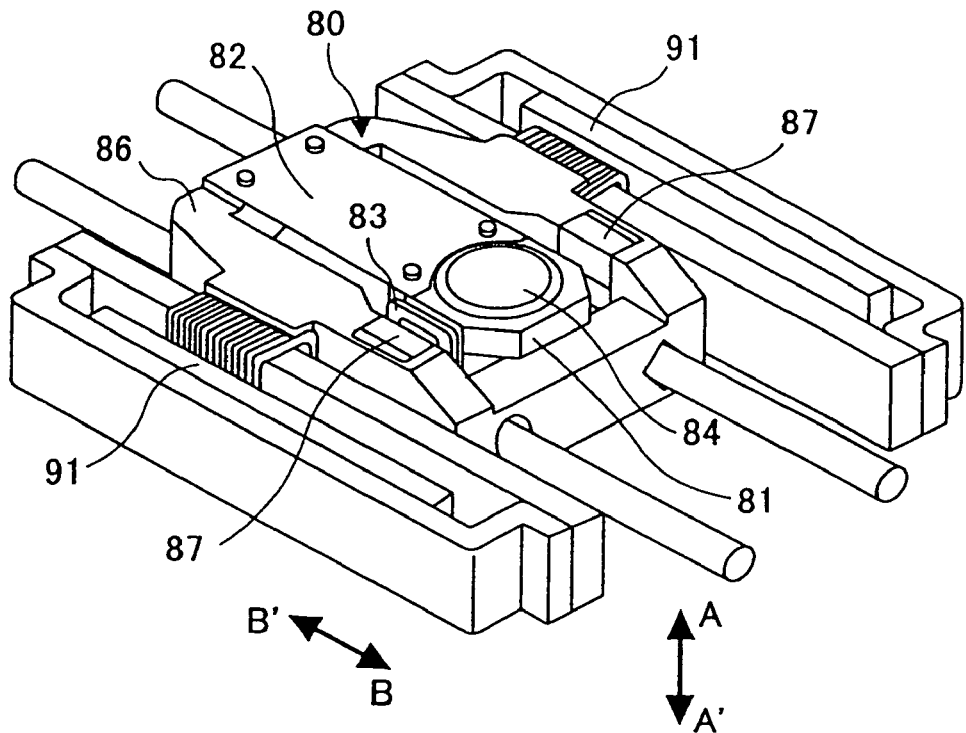
FIG. 4 shows a perspective view of the moving head 80 shown in FIG. 3.

The focus error detector 36a corresponds to the first photo detector 105 as shown in FIG. 3 and the track error detector 36b corresponds to the second photo detector 109 as shown in FIG. 3. The lens actuator 37 corresponds to the focus coil 83 and the permanent magnet 87 as shown in FIG. 3 and FIG. 4. The voice coil motor 38 corresponds to the voice coil motor 91 as shown in FIG. 4.

The upper interface 11 interfaces with an upper apparatus. Data transmitted to and received from the upper apparatus is temporarily stored in the buffer memory 12. The MPU 13 and the disk controller 14 control operation of the disk apparatus.

The read/write LSI 15 modulates and demodulates the data. The read/write LSI 15 modulates the data and supplies the modulated data to the laser diode unit 31 when the data are written to the disk. The read/write LSI 15 controls the laser diode unit 31 so that the laser diode unit 31 emits light for read-use to the disk when the data are read from the disk. However, it is also possible to write the data to the disk using the magnetic modulation recording method in which the data to be written to the disk is supplied to the magnetic head.

The light emitted to the disk 90 from the laser diode unit 31 is reflected by the disk 90 and the reflected light is supplied to the ID/MO detector 32, the focus error detector 36a and the track error detector 36b. The ID/MO detector 32 detects the ID/MO signal component in the reflected light from the disk 90 and supplies the detected ID/MO signal to the head amplifier 33. The head amplifier 33 amplifies the ID/MO signal and supplies it to the read/write LSI 15. The read/write LSI 15 demodulates the ID and data in the amplified ID/MO signal. The data demodulated by the read/write LSI 15 are stored in the buffer memory 12.

The focus error detector 36*a* converts incident light to an electric signal and supplies the electric signal to the focus error detection circuit 17. The focus error detection circuit 17 generates a focus error signal according to the electric signal supplied from the focus error detector 36*a*.

The focus error signal generated by the focus error detection circuit 17 is supplied to the DSP 16. The DSP 16 generates a focus control signal according to the focus error signal generated by the focus error detection circuit 17 and supplies it to the driver 22. The driver 22 supplies the driving current to the lens actuator 37 according to the focus control signal supplied by the DSP 16. The lens actuator 37 moves the objective lens 84 shown in FIG. 4 and FIG. 5 in the focus direction, that is to say the directions AA', according to the driving current supplied by the driver 22. The laser light emitted by the laser diode unit 31 is focused on the disk 90 by means of moving the objective lens 84 in the focus direction.

The track error detector 36*b* converts incident light to an electric signal and supplies the electric signal to the track error detection circuit 18. The track error detection circuit 18 generates a track error signal according to the electric signal detected by the track error detector 36*b*. The track error signal generated by the track error detection circuit 18 is supplied to the DSP 16 and the track zero-crossing signal detection circuit 19. The track zero-crossing signal detection circuit 19 generates the track zero-crossing signal according to the track error signal and supplies it to the DSP 16. The DSP 16 generates a tracking control signal according to the track error signal and the track zero-crossing signal, and supplies it to the driver 23.

The driver 23 supplies the driving current to the voice coil motor 38 according to the tracking control signal supplied by the DSP 16. The voice coil motor 38 moves the moving head 80 in the radial direction of the disk 90, that is to say the directions BB', according to the driving current supplied by the driver 23, and the laser spot follows the track.

The MPU 13 generates a spindle motor control signal and supplies it to the driver 20. The driver 20 rotates the spindle motor 34 according to the spindle motor control signal supplied by the MPU 13.

Further, the MPU 13 generates a magnetic field control signal and supplies it to the driver 21. The driver 21 supplies a driving current to the magnetic field application unit 35 according to the magnetic field control signal supplied by the MPU 13. The magnetic field application unit 35 generates a bias magnetic field according to the driving current supplied by the driver 21. The bias magnetic field generated by magnetic field application unit 35 is applied to the disk 90 and used to record information on the disk 90 and/or to reproduce the information recorded on the disk 90.

Figure 5:
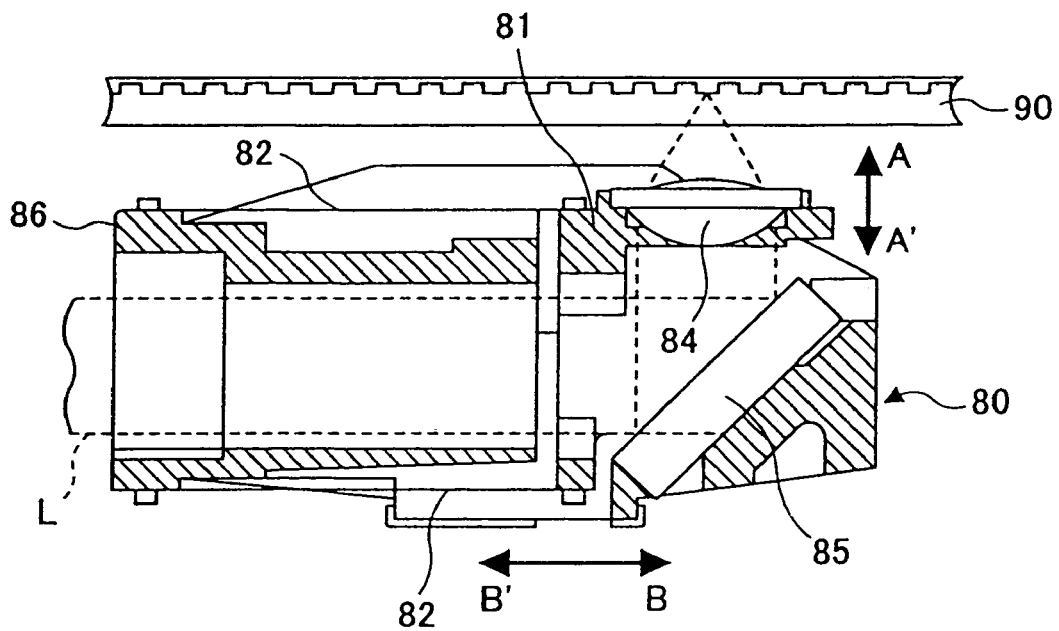
FIG. 5 shows a sectional view of the moving head 80 shown in FIG. 3.
Figure 6:
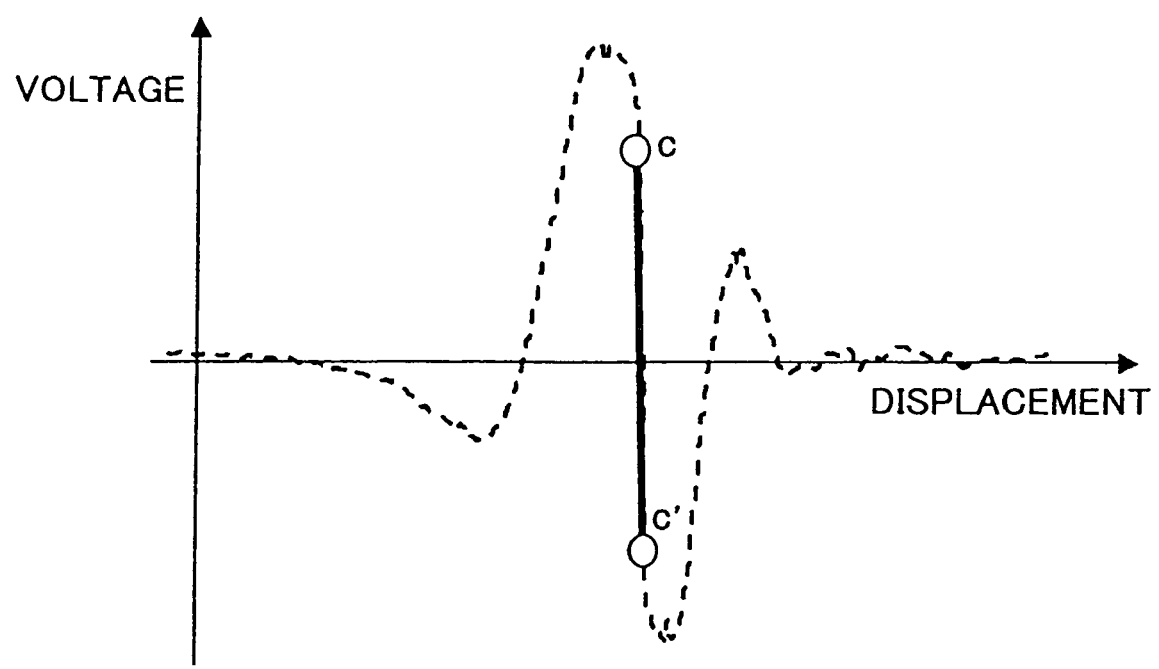
FIG. 6 shows an output characteristic of a focus error signal when the conventional objective lens is displaced.
Figure 7:
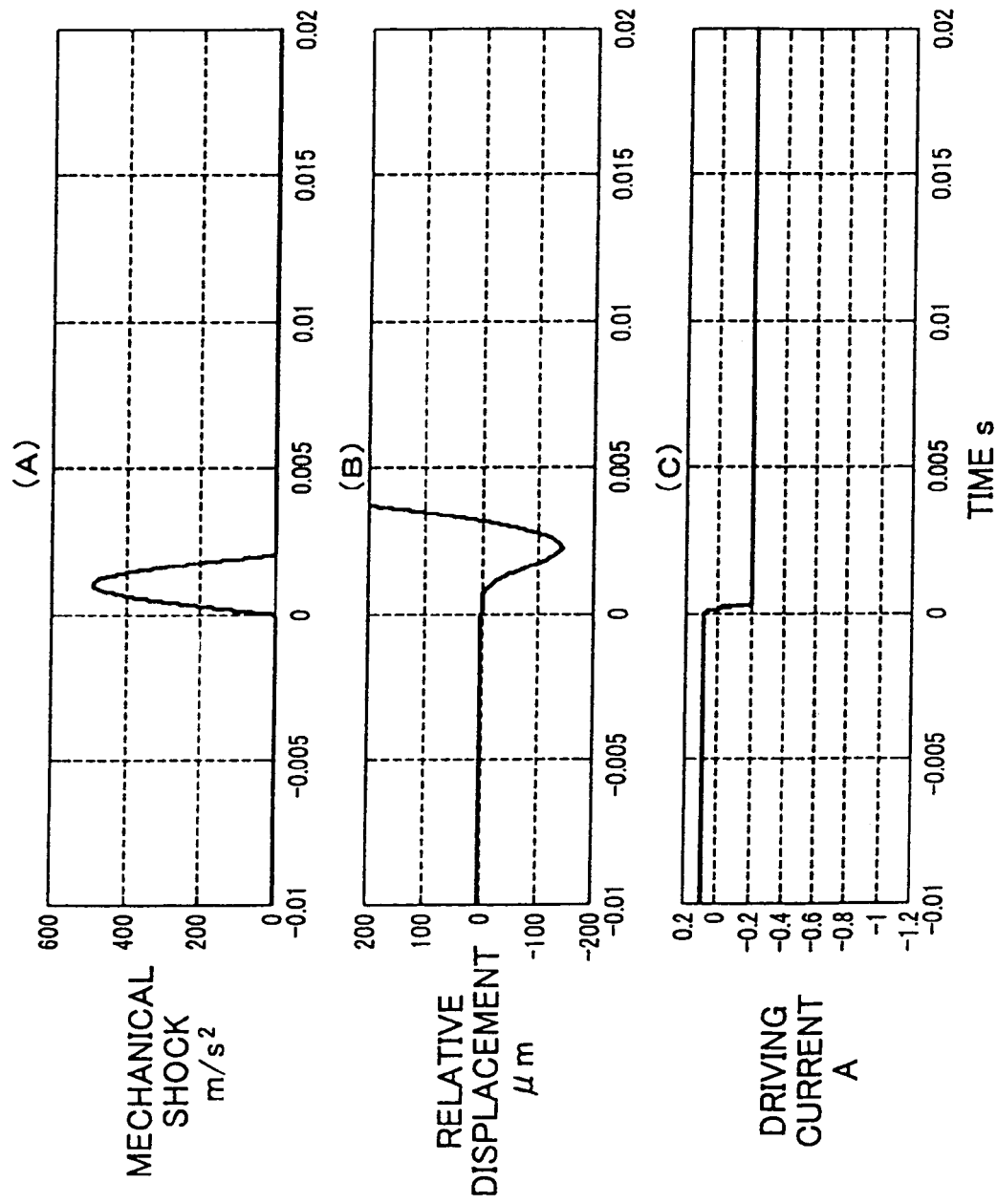
FIG. 7 shows time response characteristics when a mechanical shock is applied to the conventional disk apparatus.

The acceleration sensor 24 senses an acceleration in the focus direction, that is to say the directions AA' shown in FIG. 4 and FIG. 5. The acceleration detection signal produced by the acceleration sensor 24 is supplied to the acceleration detection circuit 25. The acceleration detection circuit 25 supplies a high level signal to the DSP 16 when the acceleration signal becomes greater than a predetermined level.

The DSP 16 controls the lens actuator 37 and the voice coil motor 38 in order to move the objective lens away from the disk 90 when acceleration detection signal becomes the high level. This action is controlled by firmware for the DSP 16.

Next, an operation to move the objective lens away from the disk 90 will be described.

FIG. 9 shows a flow chart of a collision prevention operation to move the objective lens away from the disk by the DSP 16 according to the present invention. FIG. 10 shows waveforms of the collision prevention operation according to the present invention.

When the acceleration of the mechanical shock applied to the disk apparatus increases to greater than a predetermined threshold value, the output level of the acceleration detection circuit 25 changes from a low level to a high level. The DSP 16 detects when the output of the acceleration detection circuit 25 becomes the high level at step S1-1, then at step S1-2 it starts a timer 16*a* arranged in the DSP 16. The DSP 16 provides a first collision prevention signal to the driver 22 at step S1-3. The DSP 16 also provides the driver 23 with the collision prevention signal. The driver 23 provides the driving current to the voice coil motor 38 according to the collision prevention signal supplied by the DSP 16. The voice coil motor 38 is driven according to the driving current supplied by the driver 23 so that the moving head 80 is carried to a place where the objective lens 84 is not opposite to the disk 90.

The first collision prevention signal supplied to the driver 22 is a signal that indicates to the driver 22 such that the current supplied from the driver 22 to the focus coil 83 of the actuator 37 has a value of around −1 [A]. The focus coil 83 is supplied with the current having a value of −1 [A] according to the first collision prevention signal as shown in FIG. 10(C).

The objective lens 84 is driven with a force corresponding to the first collision prevention signal in the direction of arrow A', that is to say the direction in which the objective lens 84 is moved away from the disk 90 as shown in FIG. 4 and FIG. 5, because the focus coil 83 is supplied with the current having the value of around −1 [A].

The DSP 16 monitors, at step S1-4, whether the count value of the timer 16*a* becomes a predetermined value, for example 10 ms.

When the DSP 16 detects, at step S1-4, that the count value of the timer 16*a* becomes a value equal to the predetermined value of 10 ms, the DSP 16 supplies the driver 22 with a second collision prevention signal in place of the first collision prevention signal at step S1-5.

The DSP 16 monitors the collision prevention operation in which the objective lens 84 is carried to a place where the objective lens 84 is not opposite to the disk 90 by the voice coil motor 38 at step S1-6. When it is decided that the objective lens 84 is moved to a place where the objective lens 84 is not opposite to the disk 90 at the step S1-6, then the DSP 16 stops supplying the second collision prevention signal to the driver 22 at step S1-7. The current supplied to the focus coil 83 is also stopped because the second collision prevention signal supplied to the driver 22 is stopped. When the second collision prevention signal supplied to the driver 22 is stopped at the step S1-7, then the timer 16*a* is reset at step S1-8 and the process is ended. The second collision prevention signal is a signal that is sent to the driver 22 so that the current supplied from the driver 22 to the focus coil 83 of the lens actuator 37 has a value of around −0.2 [A]. The objective lens 84 is driven with a force corresponding to the second collision prevention signal in the direction of arrow A', that is to say the direction in which the objective lens 84 is moved away from the disk 90 because the focus coil 83 is supplied with the current having the value of −0.2 [A], and the objective lens 84 is kept away from the disk 90.

Next, an operation to move the objective lens 84 away from the disk 90 will be described precisely with some waveforms.

FIG. 10 shows waveforms of a collision prevention operation. In FIG. 10, the mechanical shock having a half sine shape is applied to the disk apparatus at time zero, the mechanical shock having a maximum acceleration of 50 G (491 m/s$^2$) and a duration of 2 ms, while focus servo control is being performed, and then the mechanical shock is detected, and the focus collision prevention current of −1.0 [A] is supplied to the focus coil 83 as shown in FIG. 10(C). When 0.1 second of time has elapsed, then the focus collision prevention current of −1.0 [A] is changed to −0.2 [A] by the timer 16a. FIG. 10(A) shows the mechanical shock. FIG. 10(B) shows relative displacement between the objective lens 84 and the disk 90 in the direction perpendicular to the disk surface, that is to say the focus direction. FIG. 10(C) shows the lens actuator driving current.

In FIG. 10(B), a negative value of the relative displacement shows that the position of the objective lens 84 is nearer to the disk 90 than the position of the focus point. The objective lens 84 is moved toward the disk 90 about 1 μm from the focus point of a value of zero at time t1, because of the mechanical shock generated at time t0. Then, the objective lens 84 is moved away from the disk 90. In this embodiment as described above, the driving current is switched from −1.0 [A] to −0.2 [A] at a time t2 as shown with a bold line 1001 in FIG. 10(C). However, the driving current may be changed through a plurality of steps between −1.0 [A] to −0.2 [A] to switch the driving current as shown with a dotted line 1003 in FIG. 10(C). Further, the driving current may be changed linearly between −1.0 [A] to −0.2 [A] as shown with a chain-dotted line 1002 in FIG. 10(C).

It is possible to reduce the reaction force applied to the objective lens 84 if the driving current is changed through a plurality of steps or the driving current is changed linearly.

As shown in FIG. 10(B), the objective lens 84 moves only 1 μm toward the disk 90. As a result, a stopper mechanism is not required. Further, as a stopper mechanism is not required, the present invention can be applied to an optical storage device and an optical device in which the working distance between the objective lens 84 and the disk 90 is less than several tens of μm. That is to say, the present invention can be applied to optical storage devices, in which recording and reproduction is performed using an objective lens for a short wavelength light beam and a large numerical aperture, for example a wavelength of 410 nm and a numerical aperture (NA) of 0.85.

The current of 1.0 [A] provided through the focus coil 83 generated by the first collision prevention signal is five times as great as the maximum rating current of 0.2 [A] for the focus coil 83. However, in the present embodiment, the current of 1.0 [A] is supplied to the focus coil 83 for only 10 ms and the current of 1.0 [A] is not supplied to the focus coil 83 for a long time. Therefore the focus coil 83 does not suffer any damage caused by Joule heat. Even if the current of 1.0 [A] is supplied to the focus coil 83 for 100 ms, the focus coil 83 does not suffer any damage. In this embodiment, the current of −1.0 [A] is supplied to the focus coil 83 for only 10 ms. Therefore, the focus coil 83 does not suffer any damage. In the embodiment described above, the example of the current through the focus coil 83 caused by the first collision prevention signal is a constant current of 1.0 [A]. However, it is possible to use a current having another value through the focus coil 83 if the current through the focus coil 83 can generate a force that can move the objective lens 84 away from the disk against the mechanical shock applied to the disk apparatus. For example, as a second embodiment, the collision prevention signal has a waveform that can follow change with the magnitude of the output of the acceleration sensor.

FIG. 11 shows waveforms of a collision prevention operation of the second embodiment according to the present invention. In FIG. 11, a mechanical shock having a half sine shape is applied to the disk apparatus at time zero, the mechanical shock having an acceleration of 50 G (491 m/s$^2$) and a duration of 2 ms, while focus servo control is being performed. The focus actuator driving current that follows the mechanical shock is shown by a dotted line 1101 in FIG. (C). In this embodiment, the current 1102 shown in FIG. 11(C) is supplied to the focus coil 83. A constant value of −0.2 [A] added to the current 1101 equals the current 1102. At a time t2 of 0.002 second, the acceleration of the mechanical shock becomes zero. Therefore, the collision prevention current through the focus coil 83 becomes only −0.2 [A].

FIG. 11(B) shows relative displacement between the objective lens 84 and the disk 90. In FIG. 11(B), a negative value of the relative displacement shows that the position of the objective lens 84 is nearer to the disk 90 than the position of the focus point. The objective lens 84 is moved toward the disk 90 about 1 μm from the focus point of 0 μm at time t1, because of the mechanical shock generated at time t0. Then, the objective lens 84 is moved away from the disk 90.

It is known that a duration of the mechanical shock is at most several ms to several hundreds of ms when an apparatus is dropped or falls. Therefore, the focus coil 83 is not burnt even if such collision prevention current that follows the mechanical shock is supplied to the focus coil 83.

The embodiments described above, use a disk apparatus as the optical device. However, the present invention is not limited to a disk apparatus, and it is also possible to apply the present invention to an optical storage device using other optical storage media such as an optical card without departing from the scope of the present invention. Further, the present invention is not limited to the optical storage device using a disk or an optical card, and the present invention can be applied to an optical device such as a microscope and a light emission device. The present invention can be applied to an optical device having a lens opposite to a storage medium, which comprises an actuator that moves the lens, a mechanical shock acceleration sensing means that senses the mechanical shock acceleration, a collision prevention control means that drives the actuator for a predetermined period with a first driving force greater than a maximum rating force of the actuator when the mechanical shock acceleration sensed by the mechanical shock acceleration sensing means becomes a value equal to a predetermined value, and then, that drives the actuator with a second driving force smaller than the maximum rating force of the actuator other than the first force greater than the maximum rating force.

The present invention can also be applied to automatic focus control in a camera as an optical device.

The present invention is not limited to the specifically disclosed embodiments, and variations and modifications may be made without departing from the scope of the present invention.

The present application is based on Japanese priority application No. 2001-373103 filed on Dec. 06, 2001 and No. 2002-097179 filed on Mar. 29, 2002, the entire contents of which are hereby incorporated by reference.

What is claimed is:

1. An optical storage device having a lens opposite to a storage medium comprising:
an actuator that moves said lens;
a mechanical shock acceleration sensing unit that senses mechanical shock acceleration;
a collision prevention control unit that drives said actuator for a predetermined period of time with a first driving force greater than a maximum rating force of said actuator when said mechanical shock acceleration sensed by said mechanical shock acceleration sensing unit becomes a value equal to a predetermined value, and then, that drives said actuator with a second driving force smaller than said maximum rating force of said actuator.

2. The optical storage device as claimed in claim 1, wherein said collision prevention control unit varies the driving force of said actuator from said first driving force to said second driving force through a plurality of steps including said first driving force and said second driving force, each of which has a different force.

3. The optical storage device as claimed in claim 1, wherein said collision prevention control unit varies the driving force of said actuator from said first driving force to said second driving force linearly.

4. The optical storage device as claimed in claim 1, wherein said collision prevention control unit varies the driving force of said actuator from said first driving force to said second driving force at a step.

5. The optical storage device as claimed in claim 1, wherein said actuator has a coil and magnets opposite to said coil,
said collision prevention control unit drives said coil for a predetermined period of time with a first driving current greater than a maximum rating current of said coil when said mechanical shock acceleration sensed by said mechanical shock acceleration sensing unit becomes a value equal to a predetermined value, and then, drives said coil with a second driving current smaller than said maximum rating current of said coil.

6. The optical storage device as claimed in claim 2, wherein said actuator has a coil and magnets opposite to said coil,
said collision prevention control unit drives said coil for a predetermined period of time with a first driving current greater than a maximum rating current of said coil when said mechanical shock acceleration sensed by said mechanical shock acceleration sensing unit becomes a value equal to a predetermined value, and then, drives said coil with a second driving current smaller than said maximum rating current of said coil.

7. The optical storage device as claimed in claim 5, wherein said collision prevention control unit varies the driving current of said coil from said first driving current to said second driving current linearly.

8. The optical storage device as claimed in claim 5, wherein said collision prevention control unit varies the driving current of said coil from said first driving current to said second driving current in a step.

9. The optical storage device as claimed in claim 1, wherein said actuator moves said lens in a direction perpendicular to a surface of said storage medium.

10. The optical storage device as claimed in claim 5, wherein said actuator moves said lens in a direction perpendicular to a surface of said storage medium.

11. An optical device comprising:
an actuator that moves a lens;
a mechanical shock acceleration sensing unit that senses mechanical shock acceleration;
a collision prevention control unit that drives said actuator for a predetermined period of time with a first driving force greater than a maximum rating force of said actuator when said mechanical shock acceleration sensed by said mechanical shock acceleration sensing unit becomes a value equal to a predetermined value, and then, that drives said actuator with a second driving force smaller than said maximum rating force of said actuator.

12. The optical device as claimed in claim 11, wherein said collision prevention control unit varies the driving force of said actuator from said first driving force to said second driving force linearly.

13. The optical device as claimed in claim 11, wherein said collision prevention control unit varies the driving force of said actuator from said first driving force to said second driving force in a step.

14. The optical device as claimed in claim 11, wherein said actuator has a coil and magnets opposite to said coil,
said collision prevention control unit drives said coil for a predetermined period of time with a first driving current greater than a maximum rating current of said coil when said mechanical shock acceleration sensed by said mechanical shock acceleration sensing unit becomes a value equal to a predetermined value, and then, drives said coil with a second driving current smaller than said maximum rating current of said coil.

15. The optical device as claimed in claim 14, wherein said collision prevention control unit varies the driving current of said coil from said first driving current to said second driving current linearly.

16. The optical device as claimed in claim 14, wherein said collision prevention control unit varies the driving current of said coil from said first driving current to said second driving current in a step.

17. An optical storage device having a lens opposite to a storage medium comprising:
an actuator that moves said lens;
a mechanical shock acceleration sensing unit that senses mechanical shock acceleration;
a collision prevention control unit that drives said actuator with a first driving force greater than a force due to the mechanical shock acceleration when said mechanical shock acceleration sensed by said mechanical shock acceleration sensing unit becomes a value equal to a predetermined value, and then, that drives said actuator with a second driving force smaller than a maximum rating force of said actuator when said mechanical shock acceleration sensed by said mechanical shock acceleration sensing unit becomes a value smaller than said predetermined value.

18. The optical storage device as claimed in claim 17, wherein said collision prevention control unit drives said actuator with another first driving force which force follows said mechanical shock acceleration or which force follows another acceleration that is shifted by the predetermined constant value from said mechanical shock acceleration when said mechanical shock acceleration sensed by said mechanical shock acceleration sensing unit becomes a value equal to the predetermined value, and then, drives said actuator with another second driving force smaller than the maximum rating force of said actuator when said mechanical shock acceleration sensed by said mechanical shock acceleration sensing unit becomes a value smaller than said predetermined value.

19. The optical storage device as claimed in claim 17, wherein said actuator has a coil and magnets opposite to said coil, said collision prevention control unit drives said coil with a first driving current that generates a force greater than a force due to the sensed mechanical shock acceleration when said mechanical shock acceleration sensed by said mechanical shock acceleration sensing unit becomes a value equal to a predetermined value, and then, that drives said coil with a second driving current smaller than a maximum rating current of said coil when said mechanical shock acceleration sensed by said mechanical shock acceleration sensing unit becomes a value smaller than the predetermined value.

20. An optical device comprising:

an actuator that moves a lens;

a mechanical shock acceleration sensing unit that senses mechanical shock acceleration;

a collision prevention control unit that drives said actuator with a first driving force greater than the force of the sensed mechanical shock acceleration when said mechanical shock acceleration sensed by said mechanical shock acceleration sensing unit becomes a value equal to a predetermined value, and then, that drives said actuator with a second driving force smaller than a maximum rating force of said actuator when said mechanical shock acceleration sensed by said mechanical shock acceleration sensing unit becomes a value smaller than said predetermined value.

* * * * *